(12) United States Patent
Yamauchi (10) Patent No.: US 7,348,990 B2
(45) Date of Patent: Mar. 25, 2008

(54) MULTI-DIMENSIONAL TEXTURE DRAWING APPARATUS, COMPRESSING APPARATUS, DRAWING SYSTEM, DRAWING METHOD, AND DRAWING PROGRAM

(75) Inventor: Yasunobu Yamauchi, Kanagawa (JP)

(73) Assignee: Kabushki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/445,957

(22) Filed: May 28, 2003

(65) Prior Publication Data

US 2004/0041816 A1   Mar. 4, 2004

(30) Foreign Application Priority Data

May 31, 2002   (JP)   .................... P. 2002-160228

(51) Int. Cl.
*G09G 5/00*   (2006.01)
(52) U.S. Cl. .................. 345/582; 345/426; 345/583; 345/584; 345/585; 345/586; 345/587
(58) Field of Classification Search ................ 345/419, 345/420, 552, 582, 583–588
See application file for complete search history.

(56) References Cited

U.S. PATENT DOCUMENTS

| | | | |
|---|---|---|---|
| 5,461,712 A * | 10/1995 | Chelstowski et al. | 345/543 |
| 5,566,283 A * | 10/1996 | Modegi et al. | 345/426 |
| 6,226,005 B1 * | 5/2001 | Laferriere | 345/426 |
| 6,297,834 B1 | 10/2001 | Malzbender | |
| 6,429,872 B1 * | 8/2002 | Ernst | 345/584 |
| 6,525,728 B2 * | 2/2003 | Kamen et al. | 345/423 |
| 6,738,058 B1 * | 5/2004 | Gruber et al. | 245/419 |
| 6,744,442 B1 * | 6/2004 | Chan et al. | 345/587 |
| 6,765,582 B1 * | 7/2004 | Cohen et al. | 345/582 |
| 6,831,659 B1 * | 12/2004 | Mukoyama et al. | 345/619 |
| 6,850,243 B1 * | 2/2005 | Kilgariff et al. | 345/582 |

OTHER PUBLICATIONS

Dana, K. J. et al., "Reflectance and Texture of Real-world Surfaces", ACM Transactions on Graphics, vol. 18, No. 1, pp. 1-34, (Jan. 1999).
Notice of Reasons for Rejection issued by the Japanese Patent Office on Sep. 26, 2006, for Japanese Patent Application No. 2002-160228, and English-language translation thereof
Nishino et al., "Eigen-Texture Method: Appearance Compression and Synthesis Based on 3D Model for Mixed Reality," Journal of the Institute of Electronics, Information and Communication Engineers (Oct. 25, 1999), J82-D-II:1793-1803.

* cited by examiner

*Primary Examiner*—Kee M. Tung
*Assistant Examiner*—Antonio A Caschera
(74) *Attorney, Agent, or Firm*—Finnegan, Henderson, Farabow, Garrett & Dunner, L.L.P.

(57) ABSTRACT

As for a multi-dimensional texture constituted by a plurality of textures different in photographing environment such as a viewing position or lighting conditions, texture images constituting the multi-dimensional texture are rearranged block by block or pixel by pixel, and converted into an anisotropic texture expressing anisotropic variations of the multi-dimensional texture in an area corresponding to the block or the pixel.

23 Claims, 11 Drawing Sheets

Photographic image (Texture)

MULTI-DIMENSIONAL TEXTURE DRAWING APPARATUS, COMPRESSING APPARATUS, DRAWING SYSTEM, DRAWING METHOD, AND DRAWING PROGRAM

CROSS-REFERENCE TO THE RELATED APPLICATIONS

This application is based upon and claims the benefit of priority from the prior Japanese Patent Application No. 2002-160228 filed on May 31, 2002; the entire contents of which are incorporated herein by reference.

BACKGROUND OF THE INVENTION

1. Field of the Invention

The present invention relates to a multi-dimensional texture drawing apparatus, a multi-dimensional texture compressing apparatus, a multi-dimensional texture drawing system, a multi-dimensional texture drawing method and a multi-dimensional texture drawing program in a multi-dimensional texture mapping technology for generating a high-quality computer graphic image using a plurality of photographic images (texture images) taken in different conditions such as a photographing position or a lighting position.

2. Description of the Related Art

In the field of 3-dimensional computer graphics (CG), there is a technique called texture mapping, in which photographic images or the like (texture images) acquired from the real world are pasted onto the surface of a model forming the three dimensions in order to perform high-quality drawing. As the 3-dimensional model, there is typically used a polygon model which is formed out of triangular patches.

However, each texture used for texture mapping is a photographic image taken in specific lighting conditions and in a specific camera position. In the texture, information such as the shape of the 3-dimensional model to be pasted on, or a viewing position and a lighting position at the time of drawing is not taken into consideration. As a result, the texture mapping results in monotonic drawing with no variation of shades. Thus, the difference of the texture from the real photographic image is large.

Here, consider about the characteristic of a real photographic image. A real photographic image taken by a camera can be regarded as an image having acquired information of light incident on each pixel through a lens. That is, a texture image can be regarded as an aggregation of light defined by parameters such as a camera position, a camera direction and a time at the time of photographing. Therefore, there has appeared a technique for generating a high-quality image by reuse of such light information, called an image based rendering technique.

As one of such image based rendering methods, there is a method in which a plurality of photographic images acquired out of an object to be photographed in different viewing positions or different lighting conditions are provided as texture images in advance, and mapping is performed with the provided texture images being switched on the basis of information such as a normal vector, a viewing position in the object surface, and a lighting position at the time of rendering a 3-dimensional object. The method is known as a bidirectional texture function (BTF) (make reference to "K. J. Dana, B. van Ginneken, S. K. Nayar, and J. J. Koenderink. Reflectance and texture of real world surfaces. ACM Transaction on Graphics, 18(1): 1-34, 1999").

In order to prepare a large number of texture images (here referred to as "multi-dimensional texture") in accordance with a plurality of considerable photographic environments, a stupendous amount of texture memory is essential, and a technique of texture compression and transfer is required.

In the related art, there have been provided some methods, including a method in which constituent texture images are compressed in advance respectively by use of an image compression technique, and a method in which a variation of brightness for each pixel is approximated by a function, and parameters of the function are stored in advance. However, these methods have a problem that it takes much time for compression or expansion, or a problem that it is necessary to provide a restriction in photographic environment, for example, to fix the viewing position, so that there is no efficient texture/data format taking both the viewing position and the lighting position into consideration.

In addition, it will go well in the related art if one texture image is prepared for a model. Therefore, the reduction in texture cache hit ratio or the increase in texture data transfer amount due to switching of textures has not been brought into question. However, when a high-quality image is produced using a multi-dimensional texture as described above, the relative viewing position or the relative lighting position in each point on the model surface varies in accordance with the shape of the model, which is a subject of mapping. Accordingly, a texture image to be imported has to be switched in accordance with the variation of the relative viewing position or the relative lighting position. That is, there is a possibility that switching of texture images occurs frequently pixel by pixel at the time of drawing in spite of a single model.

Further, with the advance of high resolution of texture images themselves, the data size of the textures has increased. When such texture images are switched frequently, there may occur reduction in effectiveness of texture cache or a neck in transferring texture data, causing a bottleneck for real-time processing of computer graphics.

BRIEF SUMMARY OF THE INVENTION

It is preferable that texture images are stored and held in an efficient form, and data transfer overhead due to frequent switching of a large number of large-size texture images etc. can be reduced.

The present invention is developed in consideration of such circumstances. It is an object of the invention to provide a multi-dimensional texture drawing apparatus and a multi-dimensional texture drawing method in which a large amount of texture images can be switched by efficient use of a memory or calculation resources, and high-quality texture mapping can be carried out.

According to an embodiment of the invention, a multi-dimensional texture drawing apparatus includes a texture converting unit configured to rearrange a plurality of texture images forming a multi-dimensional texture image for every specific unit area to convert the plurality of texture images into textures expressing a variation of the multi-dimensional texture image in a lump, a parameter calculating unit configured to calculate a parameter as to a surface of a model in accordance with a shape of the model and drawing environment, an acquiring unit configured to acquire a texture image to be mapped from the anisotropic textures on the basis of the parameter, and a mapping unit configured to map the acquired texture image onto the model.

DETAILED DESCRIPTION OF THE INVENTION

Embodiments of the invention will be described below with reference to the drawings.

First Embodiment

Figure 1:
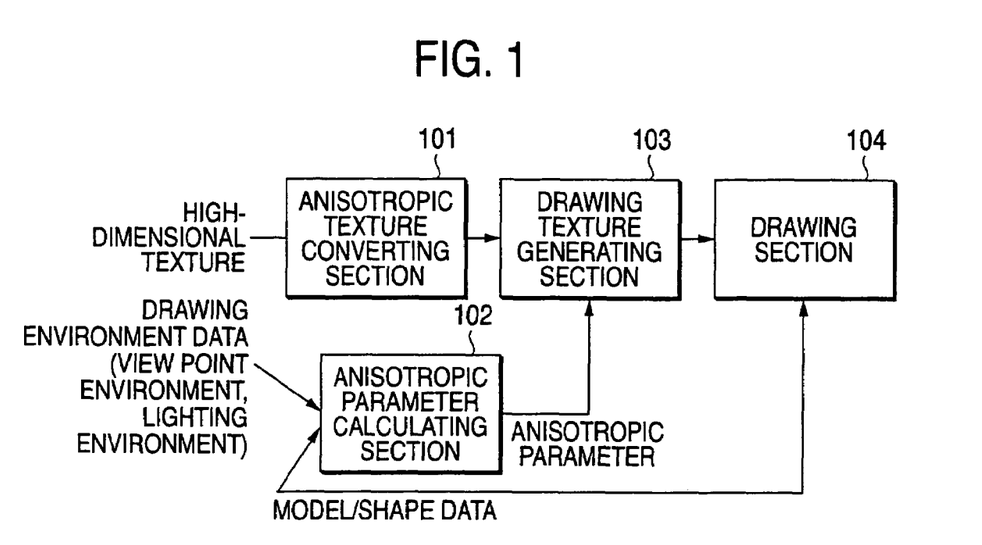
FIG. 1 is a block diagram showing the schematic configuration of multi-dimensional texture drawing apparatus according to a first embodiment of the invention.

FIG. 1 is a block diagram showing the schematic configuration of multi-dimensional texture drawing apparatus according to a first embodiment of the invention. The multi-dimensional texture drawing apparatus according to this embodiment maps a multi-dimensional texture onto the shape of a model such as a three-dimensional polygon model, in which the multi-dimensional texture includes a plurality of textures different in photographing environment such as a viewing position or lighting conditions. The multi-dimensional texture drawing apparatus includes an anisotropic texture converting section 101, an anisotropic parameter calculating section 102, a drawing texture generating section 103 and a drawing section 104. The anisotropic texture converting section 101 rearranges texture images constituting the multi-dimensional texture block by block or pixel by pixel, so as to convert the texture images into an anisotropic texture expressing anisotropic variations of the multi-dimensional texture in an area corresponding to each of blocks or each of pixels. The anisotropic parameter calculating section 102 calculates an anisotropic parameter from model/shape data, which is a subject of mapping, and drawing environment such as a viewing position or lighting conditions at the time of drawing. The drawing texture generating section 103 generates a drawing texture required for mapping from the anisotropic texture on the basis of the anisotropic parameter obtained by the anisotropic parameter calculating section 102. The drawing section 104 maps the drawing texture generated by the drawing texture generating section 103 onto the shape of the model.

The bidirectional texture function (BTF) method as described above is used in this embodiment by way of example of a mapping method for dealing with a multi-dimensional texture. In the BTF method, texture images are mapped while being switched in accordance with the viewing position and the lighting position at the time of drawing.

Description will be made below about the procedure for converting a set of textures, which are constituent components of a multi-dimensional texture, into an anisotropic texture, and the procedure for mapping with reference to the anisotropic texture.

Figure 2:
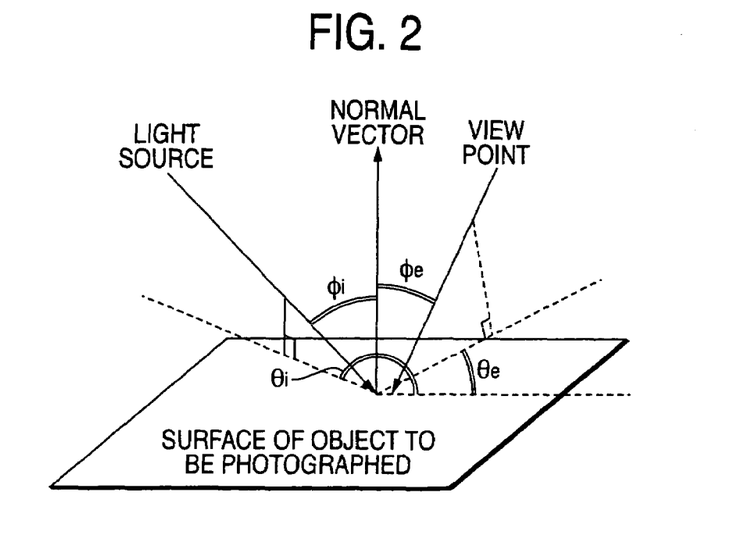
FIG. 2 is a view showing a spherical coordinate system using an object to be photographed as the origin.

In the BTF method, an aggregation of information of rays incoming from the surface of an object to the viewing position is recorded as a texture image. A set of texture images obtained thus can be regarded as an aggregation of data varying dependently on the viewing position or the lighting position relative to the surface of the object. Here, the viewing position or the lighting position relative to the surface of the object is expressed in a spherical coordinate system using the object to be photographed as the origin, as shown in FIG. 2. On assumption that the viewing position is a point at infinity and the lighting is a parallel lighting, the viewing position and the lighting position can be expressed by coordinates (θe, φe) and (θi, φi), respectively. At this time, the texture address can be defined 6-dimensionally as follows.

T(θe, φe, θi, φi, u, v)

where u and v designate an address in a texture. The technique for determining a pixel value to be drawn by a combination of an address for switching a texture itself (that is, θe, φe, θi, and φi) and an address in the texture (that is, u and v) in such a manner is called "multi-dimensional texture mapping".

Figure 3:
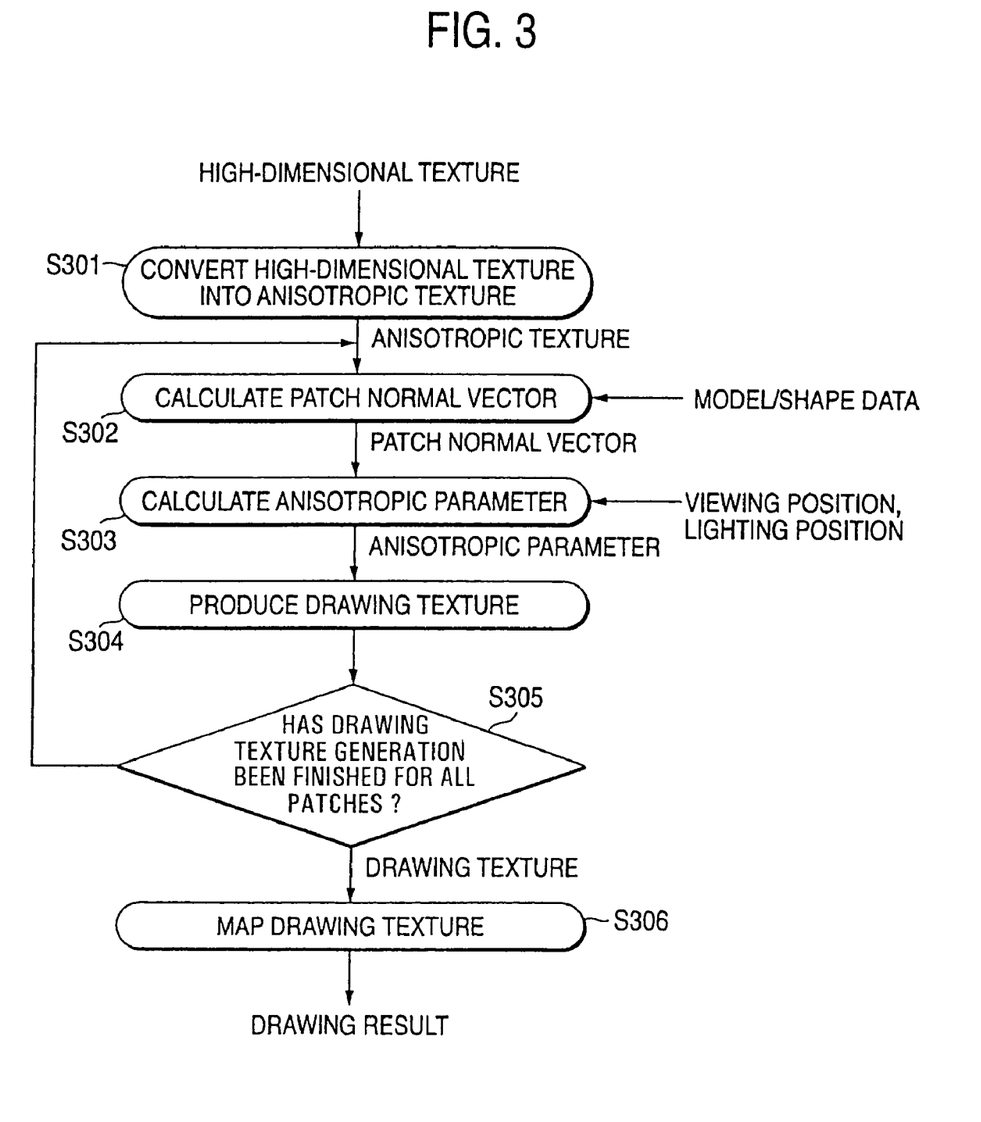
FIG. 3 is a flow chart showing the flow of processing in the multi-dimensional texture drawing apparatus according to the first embodiment.

FIG. 3 is a flow chart showing the flow of processing in the multi-dimensional texture drawing apparatus according to this embodiment.

Figure 4A:
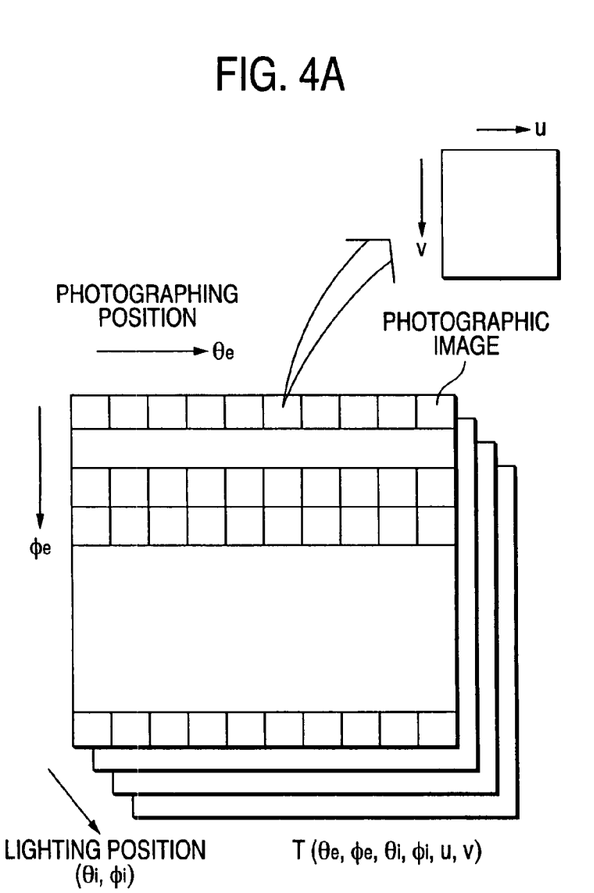
FIG. 4A is a view showing the layout of a multi-dimensional texture onto a memory space.
Figure 4B:
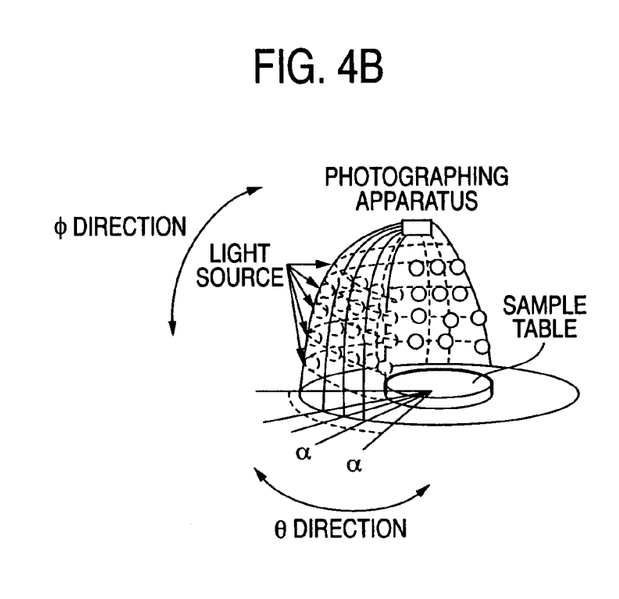
FIG. 4B is a view showing an example of a photographing apparatus for photographing an object.

First, conversion from a multi-dimensional texture into an anisotropic texture is performed in the anisotropic texture converting section 101 (S301). The multi-dimensional texture means a set of texture images, which are photographed while changing the imaging position and the lighting position respectively. FIG. 4A shows a layout of a multi-dimensional texture onto a memory space, the multi-dimensional texture being obtained by photographing one and the same object. FIG. 4B shows an example of a photographing apparatus for photographing an object.

Figure 5:
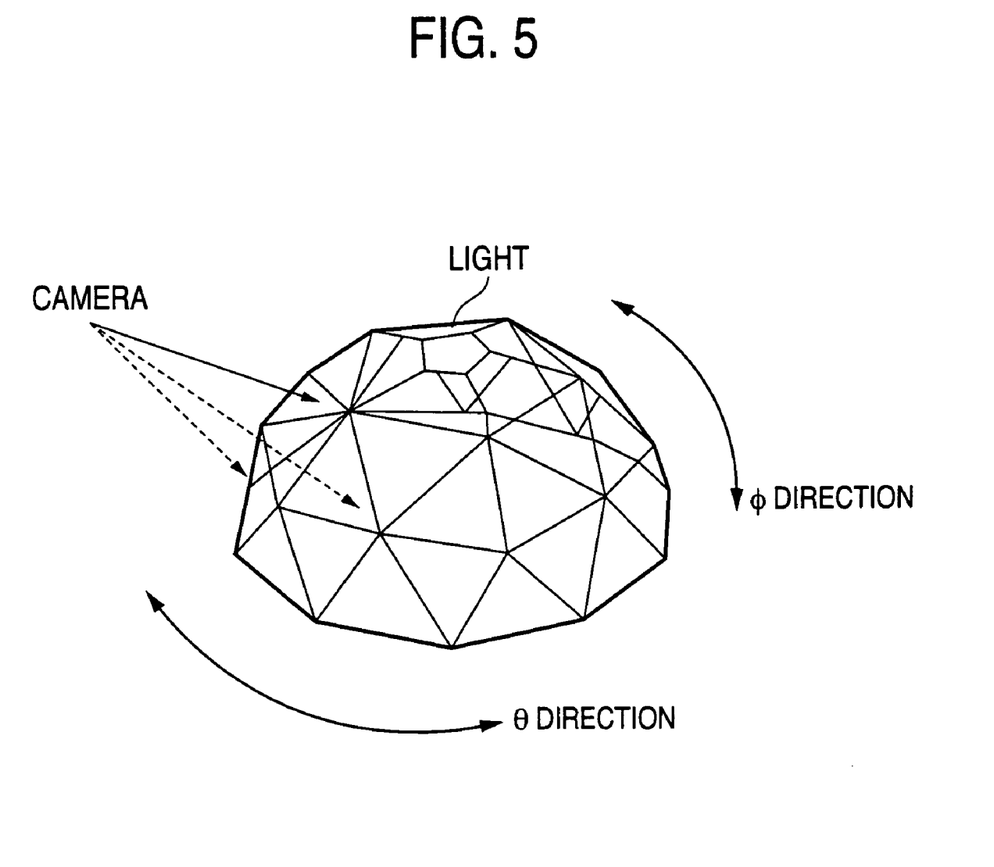
FIG. 5 is a view showing an example of photographing environment.

Specifically, in order to obtain a set of texture images, for example, under photographing environment as shown in FIG. 4B or 5, the following processes 1 and 2 are repeated.

1 To repeat photographing of an image with the lighting position being fixed and with the photographing position being shifted in the θ and φ directions by a sampling interval; and 2 To shift the lighting position in the θ or φ direction by the sampling interval.

It should be noted that the sampling intervals in θ and φ directions of the photographing position and θ and φ directions of the lighting positions may be different from each other.

Figure 12:
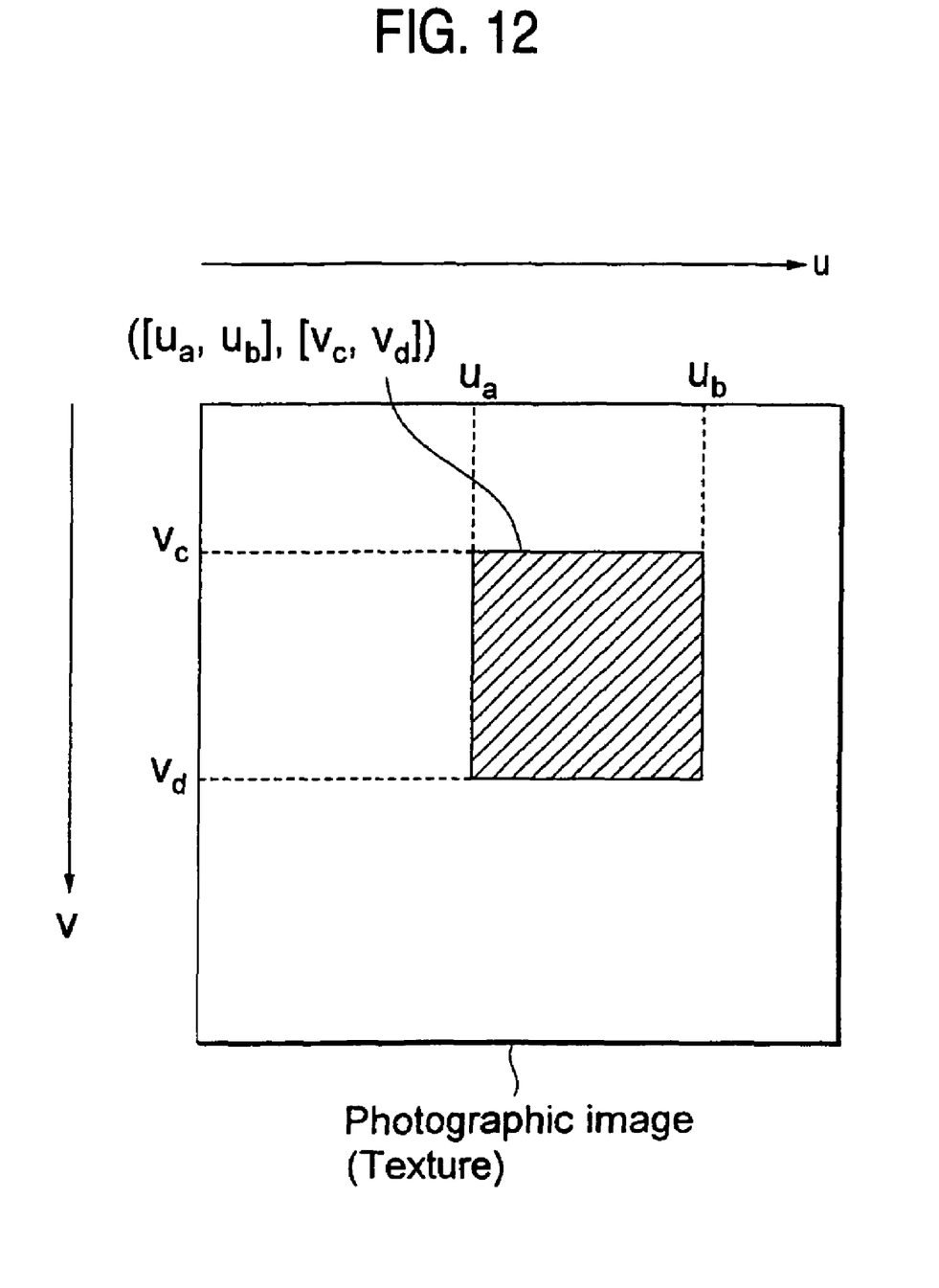
FIG. 12 is an explanation view showing an area indicated by ([ua, ub], [vc, vd]).

The anisotropic texture means a texture expressing anisotropic components in a specified texture coordinates space in a lump. The anisotropic texture can be regarded as an image (anisotropic texture image) in which anisotropic variations in the surface of an object are arranged together and stored for every coordinates. The anisotropic components include, for example, a component dependent on the lighting and/or a component dependent on the viewing position (photographing point). Incidentally, any space may be used as the specified texture coordinates space so long as the space can be specified as a desired area in 6-dimensional space defined by the texture address T. The specified texture coordinates space may be a one-point (texel) unit in the (u,v) space, an image block unit ([u0, u1], [v0, v1]), or a block area unit ([θe0, θe1], [φe0, φe1], [θi0, φi1], [φi0, φi1], [u0, u1], [v0, v1]) in the (θe, φe, θi, φi, u, v) space. Incidentally, the texel means a single pixel in a texture. Here, the sign "[a, b]" will be described. The sign "[a, b]" means a range from a to b. When the sign is used in coordinates expression, ([ua, ub], [vc, vd]) indicates a shaded area shown in FIG. 12 (ua, ub, vc, and vd are desired values, respectively).

Description will be made below about conversion into an anisotropic texture image by image block unit ([u0, u1], [v0, v1]) in the space (u,v). When the range of the specified texture coordinates space is changed, a multi-dimensional texture image is captured likewise in the changed space so that an anisotropic texture image can be generated.

When T designates the multi-dimensional texture image and Ta designates the anisotropic texture image in the coordinates (u, v), the anisotropic texture image Ta can be expressed as follows.

Collected by texel unit (u, v):

$$Ta(u,v) \subseteq T(\theta e, \phi e, \theta i, \phi i, u, v) \text{sampled in any } \theta \text{ and } \phi \text{ directions} \quad (1)$$

Collected by image block unit ([u0,u1], [v0,v1]):

$$Ta([u0,u1],[v0,v1]) \subseteq T(\theta e, \phi e, \theta i, \phi i, [u0,u1],[v0,v1]) \text{sampled in any } \theta \text{ and } \phi \text{ directions} \quad (2)$$

Figure 6:
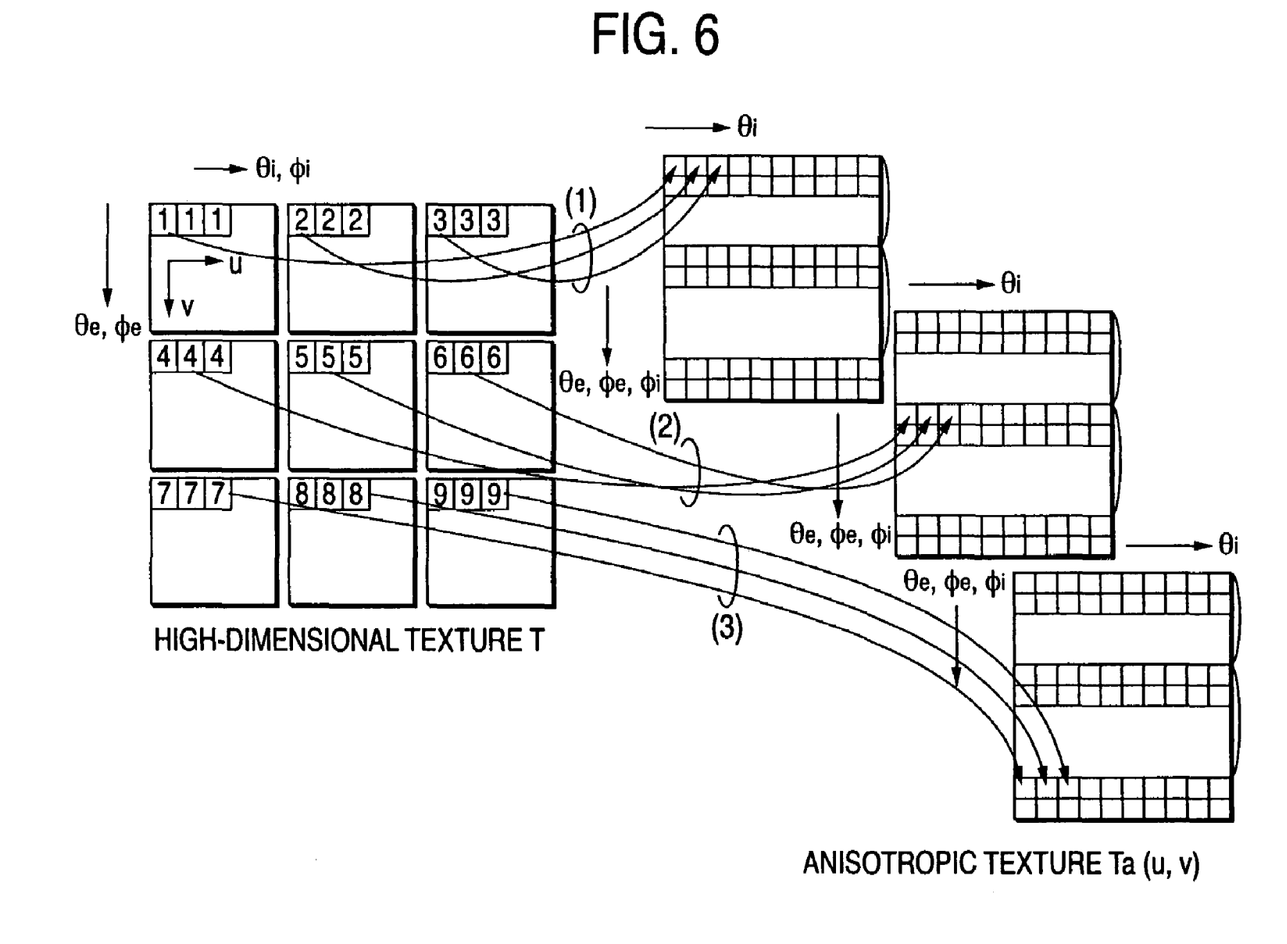
FIG. 6 is a view showing the state of conversion into anisotropic textures.
Figure 7:
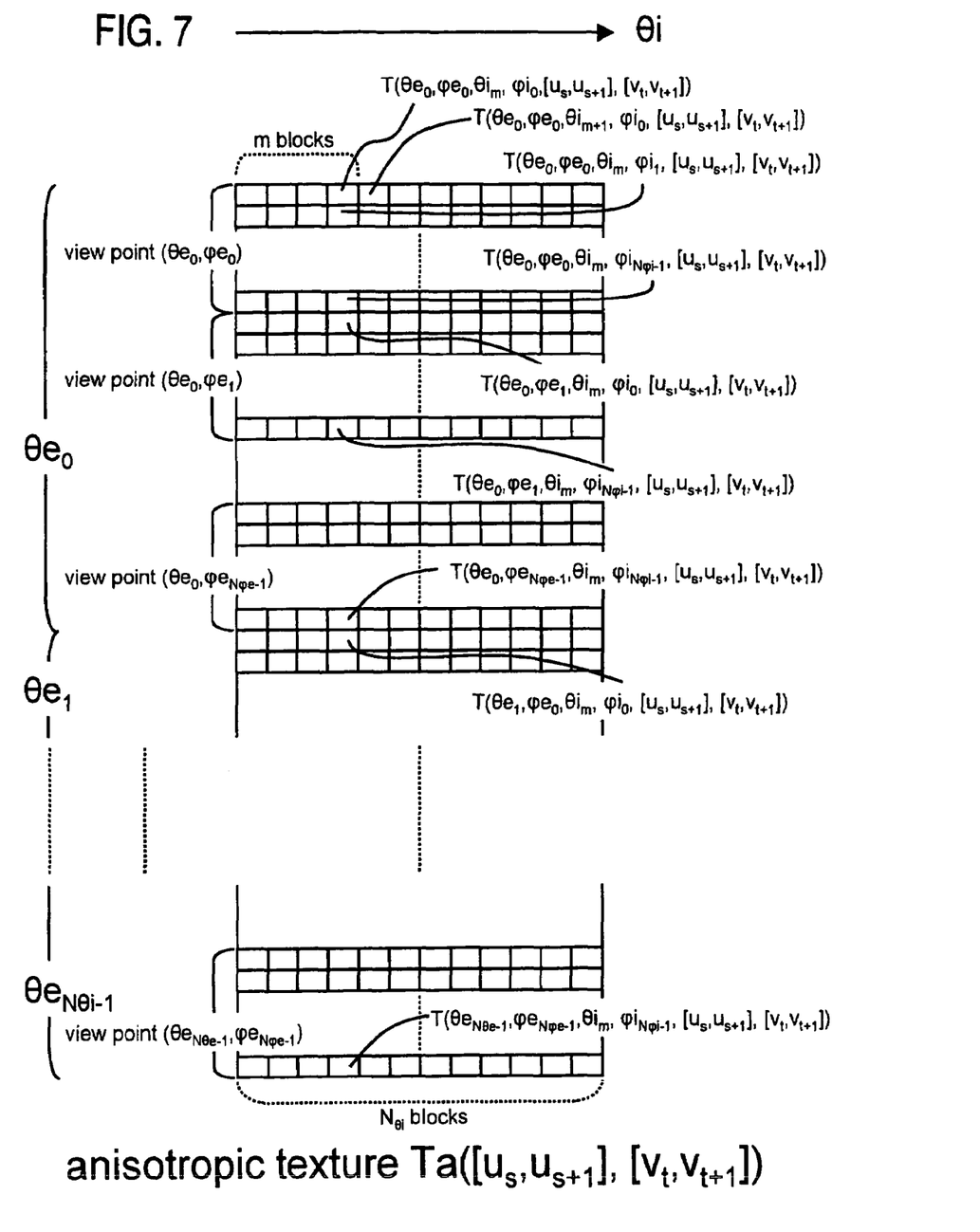
FIG. 7 is a view showing an example of the layout of a block image.

FIG. 6 shows the state of conversion into an anisotropic texture. In addition, FIG. 7 shows a specific example of a layout of block images. Each square corresponds to each texture block image ([$u_s$, $u_{s+1}$], [$v_t$, $v_{t+1}$]) constituting a multi-dimensional texture (s and t are positive integers). Here, assuming that number of samples as to the lighting azimuth (θi, φi) is set to be Nθi in the θ direction and Nφi in the φ direction, and number of samples as to the viewing azimuth (θe, φe) is set to be Nθe in the θ direction and Nφe in the φ direction.

A procedure for converting the multi-dimensional texture T into the anisotropic textures Ta will be described in detail. At first, the block image ([$u_0$, $u_1$], [$v_0$, $v_1$]) in each of texture images is extracted and arranged to form the anisotropic texture Ta([$u_0$, $u_1$], [$v_0$, $v_1$]) (corresponding to (1) in FIG. 6). In the anisotropic texture Ta, the block images are arranged in θi order in the lateral direction (in FIG. 7, the abscissa denotes θi). Also, the block images are arranged in θe, φe, and φi orders in the vertical direction so that the block images having the same viewing position and adjacent lighting positions are adjacent to each other. In macroscopic perspective, the block images are gathered in the lighting position unit and arranged by number of the lighting positions. When arrangement of the block images ([$u_0$, $u_1$], [$v_0$, $v_1$]) is completed, suffix of u or v is incremented to form another anisotropic texture Ta and similar procedure is repeated ((2), (3), . . . in FIG. 6 are conducted) until all the block images in the multi-dimensional texture are converted into the anisotropic textures Ta.

It should be noted that the layout of the block images of the multi-dimensional texture on the anisotropic texture image is not limited to that in FIG. 7. For example, the block images of the multi-dimensional texture having the same lighting position and adjacent viewing positions to each other may be arranged adjacently to each other. Alternatively, the block images may be arranged in an order following a parameter independently of their lighting positions and viewing positions.

Next, assume that size of each block image is (Su, Sv) pixels. Then, the pixel size of each anisotropic texture generated can be calculated as follows.

$$N\theta i \times N\phi i \times N\theta e \times N\phi e \times Su \times Sv (\text{pixels}) \quad (3)$$

When the number of anisotropic samples is 8 (that is, Nθi=Nφ1=Nθe=Nφe=8) and the size of the block image is 10 pixels in length and in width (Su=Sv=10), the pixel size of the anisotropic texture is 8×8×8×8×10×10=about 400,000 pixels. When anisotropic texture components with the lighting varying are arranged laterally, the size of the anisotropic texture is (8×8×10=640) pixels in width by (8×8×10=640) pixels in length.

When the resolution of each texture constituting a multi-dimensional texture is (Tu, Tv), the number of anisotropic textures generated thus can be obtained as follows.

$$(Tu/Su) \times (Tv/Sv) \quad (4)$$

For example, when a multi-dimensional texture including textures each having a size of 640×480 pixels is used, (640/10)×(480/10)=64×48=about 3,000 anisotropic textures are generated.

Next, calculation (S302) of the normal vector of a patch in the model surface and calculation (S303) of an anisotropic parameter are performed in the anisotropic parameter calculating section 102. Until a drawing texture is generated (S304) after this, processing is performed in a patch unit, the patches forming the model.

First, a 3-dimensional normal vector in the model surface is obtained by vector product on the basis of the neighboring relationship among vertexes constituting each patch. When normal vectors in respective vertexes are included in model data in advance, those normal vectors may be used.

Next, an anisotropic parameter is calculated for each patch (S303).

The anisotropic parameter defines the relationship between a viewing position and a lighting position in the surface of an object. The anisotropic parameter can be expressed by the relationship among a viewing vector which is a vector connecting one point (drawing point) on the surface of the object to be drawn with a viewing position, a lighting vector which is a vector connecting the drawing point with the lighting position, and the normal vector in the surface of the object obtained in Step 302. Assume that the azimuth of the viewing vector relative to the normal vector is expressed as a viewing azimuth anisotropic parameter (θe, φe) using a polar coordinate system. In the same manner, assume that the azimuth of the lighting vector relative to the normal vector is expressed as a lighting azimuth anisotropic parameter (θi, φi) using the polar coordinate system. Furthermore, assume that the number of samples in the viewing azimuth and lighting azimuth are the same as described above and sampling intervals in the viewing azimuth and lighting azimuth are Δθe, Δφe, Δθi, Δφi, respectively. Thus, each of anisotropic parameters may be expressed as (nθe×Δθe, nφe×Δφe) and (nθi×Δθi, nφi×Δφi). Here, 0<nθe<Nθe−1, 0<nφe<Nφe−1, 0<nθi<Nθi−1, 0<nφi<Nφi−1, and nθe, nφe, nθi, nφi are integers. The anisotropy in the surface of an object can be specified uniquely by the combination of the viewing azimuth and lighting azimuth anisotropic parameters (see FIGS. 2 and 8).

Next, in the drawing texture generating section 103, a texture image required for drawing is generated (S304) from the anisotropic texture converted and produced in the anisotropic texture conversion (S301) on the basis of the anisotropic parameter obtained by the anisotropic parameter calculation (S302).

First, an anisotropic texture including texture coordinates of a patch to be drawn is selected. A corresponding texture image is acquired from the selected anisotropic texture on the basis of the anisotropic parameter obtained in the anisotropic parameter calculation (S302). In the case of the texture layout as shown in FIG. 7, the start address of a required texture block can be acquired from the anisotropic parameter by the following address conversion.

$$(n\theta i \times Su, \{n\theta e \times N\phi i \times N\phi e + n\phi e \times N\phi i + n\phi i\} \times Sv) \qquad (5)$$

Figure 8:
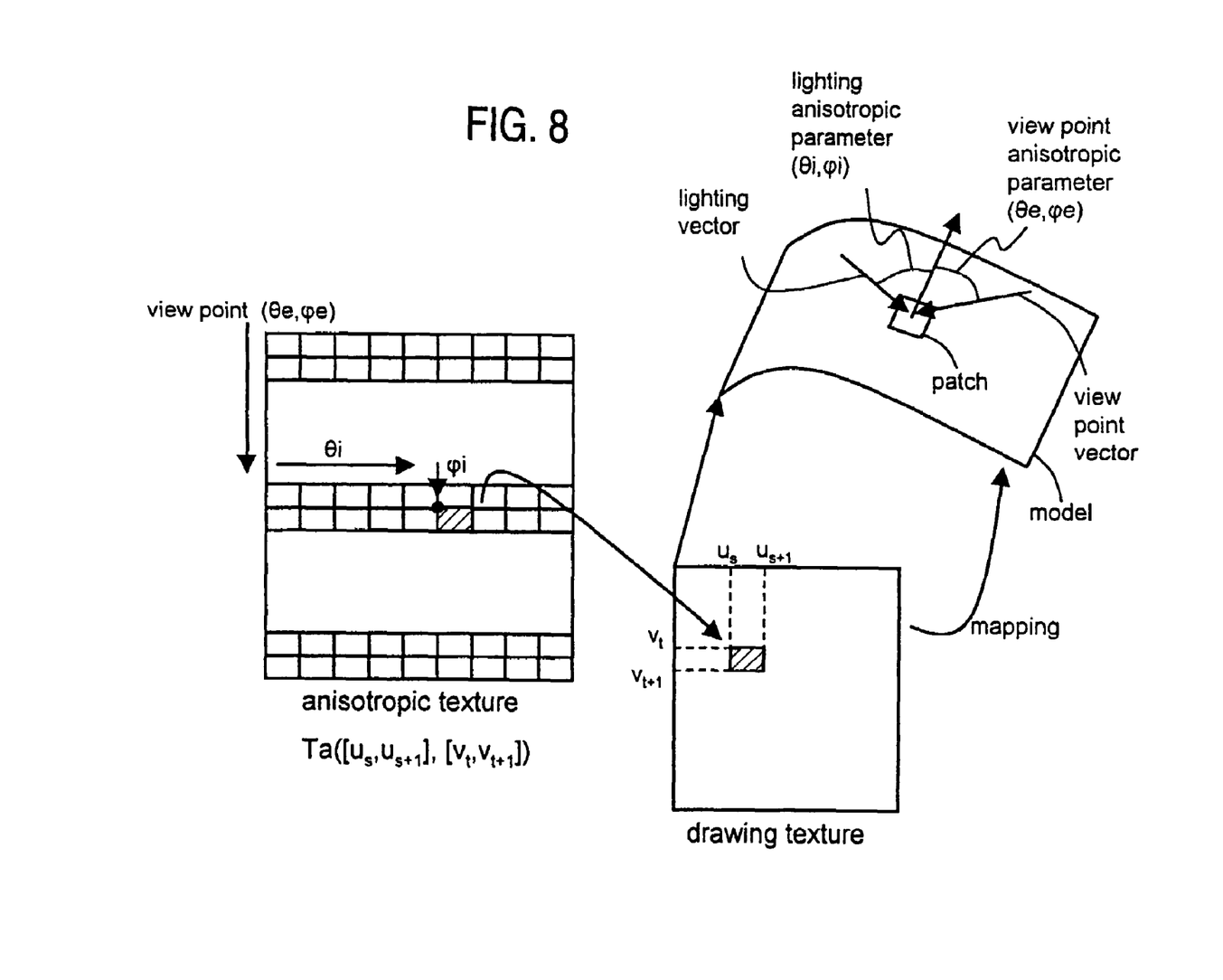
FIG. 8 is a view showing the state where a drawing texture is generated from an anisotropic texture on the basis of an anisotropic parameter.

FIG. 8 shows the state where a texture image in an area of a corresponding patch is extracted from an anisotropic texture on the basis of an anisotropic parameter, so as to generate a drawing texture.

When the texture coordinates included in the patch to be drawn is larger than the block size used in the anisotropic texture conversion (S301), that is, when the texture coordinates extend over a plurality of texture blocks, anisotropic textures corresponding to the blocks are selected sequentially by switching, and the texture address acquisition processing is performed thereon so that a texture image required for drawing can be acquired.

Finally, it is confirmed (S305) whether the drawing texture acquisition has been finished for all the patches due to the drawing texture generation (S304). When the drawing texture acquisition has not yet been finished for all the patches, the routine of processing returns to the patch normal vector calculation (S302), repeating the processing from it to the drawing texture acquisition (S304). When the drawing texture acquisition has been finished for all the patches, the texture image acquired in the drawing texture acquisition (S304) is obtained in the form of a single texture image which can be mapped onto a model. Thus, the texture image is mapped onto the model surface so as to perform drawing (S306).

In the flow of processing, a single normal vector is defined for each patch, and only one set of anisotropic parameters is obtained. In this case, however, a pictorial boundary edge may occur in the patch boundary in some granularity of patches constituting the model surface. Therefore, in the patch normal vector calculation (S302), a normal vector may be obtained for each of vertexes constituting each patch on the basis of the adjacent vertex relationship. Then, a vector average is obtained from a plurality of normal vectors obtained thus, and the subsequent processing is performed with the vector average as a representative normal vector for the patch. In this case, normal vectors are averaged between adjacent patches constituting the model surface so that it can be expected that such a patch boundary edge becomes inconspicuous.

In addition, an anisotropic parameter may be obtained on the basis of the normal vector obtained for each vertex, so as to acquire a drawing texture for each patch area. Finally, in the drawing texture generation (S304), drawing textures for the patch area obtained vertex by vertex are combined to generate a final drawing texture.

Figure 9:
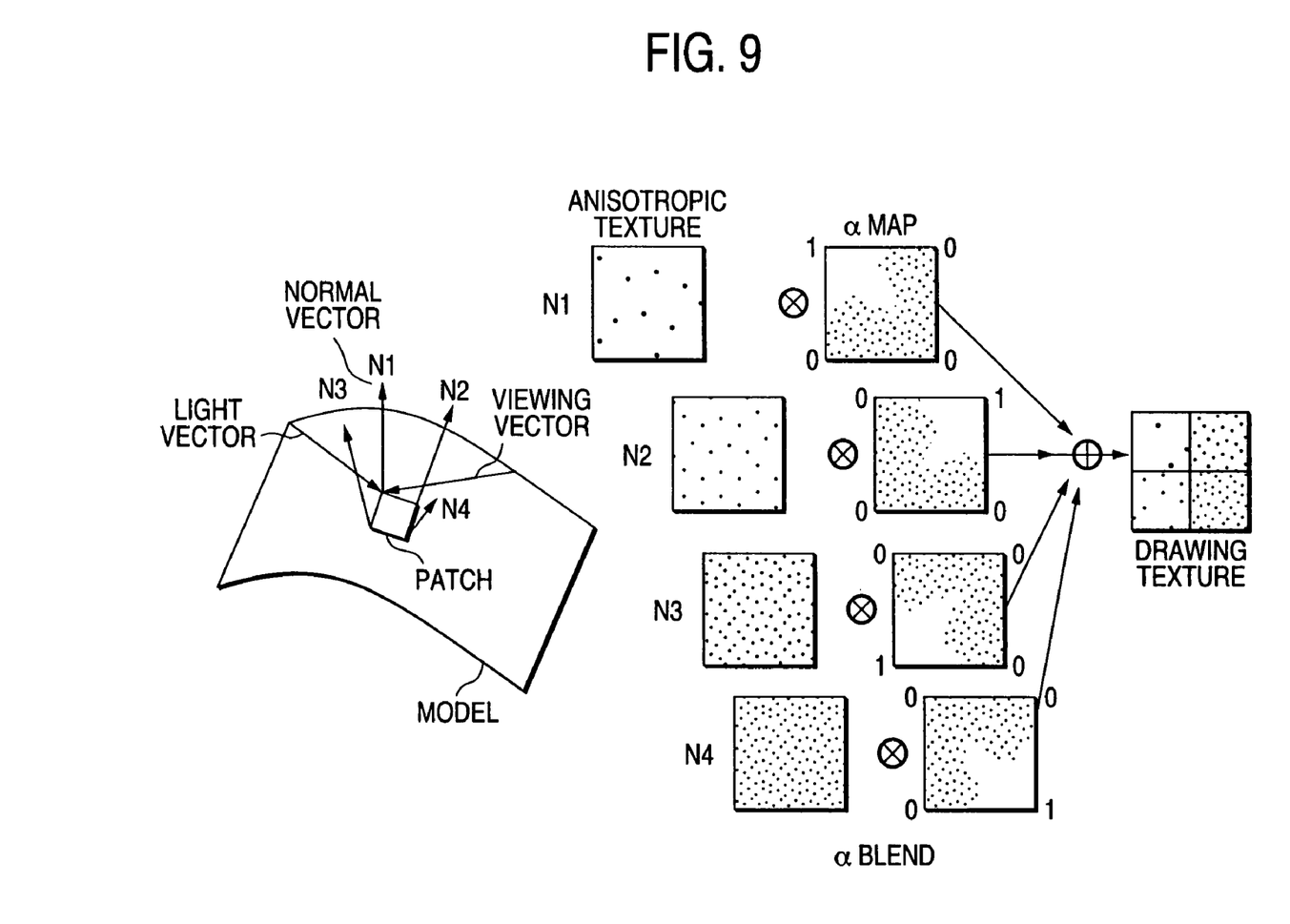
FIG. 9 is a view showing the state where a single drawing texture is obtained by combining a plurality of drawing textures by α-blend for each vertex.

Here, a plurality of drawing textures acquired for each vertex are combined by α-blend for each texel constituting the patch, based on an α-value corresponding to the distance to the vertex so as to obtain a drawing texture. As the texel is closer to the vertex, the blend ratio of the texture pixel obtained correspondingly to the vertex is increased. Thus, a drawing texture having an inconspicuous patch boundary edge can be generated (see FIG. 9).

Further, in the drawing texture generation (S304), not only the texture image based on the anisotropic parameter obtained in the anisotropic parameter calculation (S303) but also a texture image in the vicinity of the anisotropic parameter may be extracted together, and combined so that a special image effect can be created.

For example, a texture image in the vicinity ($\theta e \pm \delta \theta e$, $\phi e \pm \delta \phi e$) of the viewing position anisotropic parameter of the anisotropic parameter is also acquired from one and the same anisotropic texture image so that a lens effect can be created as if the depth of field were changed. It is noted that $\delta \theta e$ and $\delta \phi e$ may be input and specified by user.

For another example, a texture image in the vicinity ($\theta i \pm \delta \theta i$, $\phi i \pm \delta \phi i$) of the lighting anisotropic parameter of the anisotropic parameter is also acquired from one and the same anisotropic texture image so that it can be expected that an image effect is created as if there were a lighting having a spread in lighting vector, other than a parallel lighting. It is noted that $\delta \theta i$ and $\delta \phi i$ may be input and specified by user.

Although description has been made on the assumption that the model shape is formed out of patches, the model shape may be defined by a function. In this case, an anisotropic parameter can be calculated texel by texel. Thus, multi-dimensional texture mapping can be attained to reflect the details of the object in better condition.

According to the first embodiment described above, texture switching in accordance with environment at the time of drawing can be processed within one anisotropic texture only if one and the same texture coordinate system is used.

It is estimated that texels corresponding to adjacent pixels at the time of polygon drawing are not only close to each other on the texture coordinate system but also close to each other in the optical properties. Accordingly, when an anisotropic texture is acquired and produced from a specified block area on the texture coordinate system, it is possible to increase the probability that processing can be carried out within the same anisotropic texture without switching to another texture. It is therefore possible to construct a system which can draw a multi-dimensional texture with a low-capacity memory and at a low data transfer rate.

Further, when the size of texture blocks constituting the anisotropic texture is adjusted in accordance with the model shape to be drawn, it becomes easy to optimize the system as a whole in consideration of trade-off between the texture memory consumption and the overhead due to texture switching.

Second Embodiment

Figure 10:
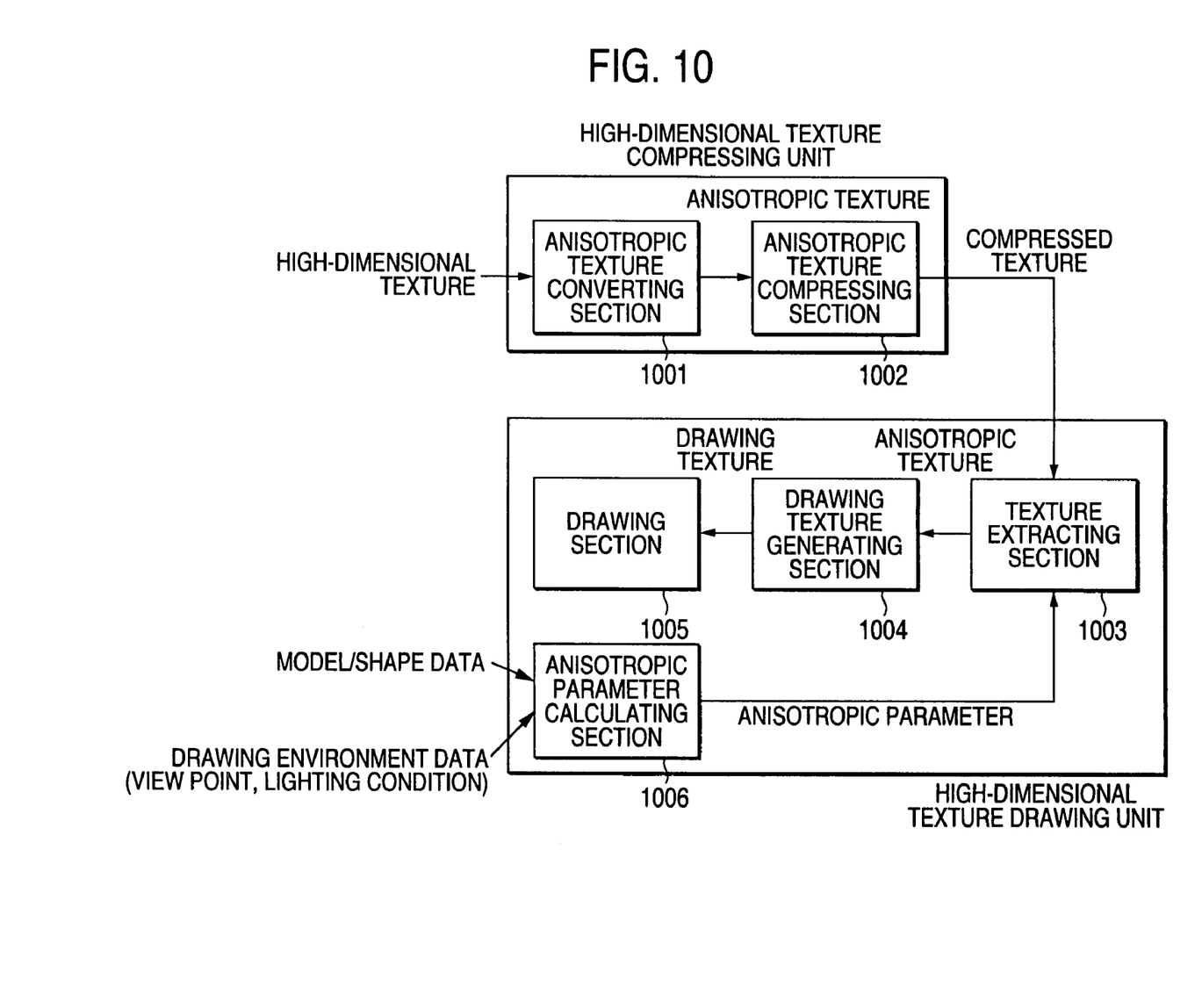
FIG. 10 is a block diagram showing the schematic configuration of a multi-dimensional texture mapping system according to a second embodiment of the invention.

Next, a second embodiment of the invention will be described. FIG. 10 is a block diagram showing the schematic configuration of a multi-dimensional texture mapping system according to the second embodiment of the invention. This system is constituted by a multi-dimensional texture compressing unit for generating a compressed texture and a multi-dimensional texture drawing unit for extracting the compressed texture and drawing. Both the units may be mounted in one and the same piece of equipment or may be mounted in different pieces of equipment distant from each other on a network. In the latter case, however, the compressed texture is transmitted from the multi-dimensional texture compressing unit to the multi-dimensional texture drawing unit through the network.

The multi-dimensional texture compressing unit is constituted by an anisotropic texture converting section 1001 and an anisotropic texture compressing section 1002. A multi-dimensional texture is constituted by a plurality of textures different in photographing environment such as a viewing position or lighting conditions. The anisotropic texture converting section 1001 rearranges texture images constituting the multi-dimensional texture for each specific unit area so as to convert the multi-dimensional texture into an anisotropic textures expressing anisotropic variations of the multi-dimensional texture in each area. The texture compressing section 1002 compresses a plurality of anisotropic textures produced thus by the anisotropic texture converting section 1001.

The anisotropic texture converting section 1001 is identical to the anisotropic texture converting section 101 in the first embodiment, and detailed description thereof will be omitted.

A general image compression method such as JPEG (Joint Photographic Expert Group), JPEG2000 or GIF (Graphics Interchange Format) may be applied to the compression method for compressing a set of anisotropic textures in the texture compressing section 1002. In addition thereto, an image compression method for textures, such as S3TC (trademark) (S3 Texture Compression), which an image compression method for a texture, a multidimensional DCT (Discrete Cosine Transform), a vector quantization or the like may be applied. In addition, a coding compression method such as an entropy coding method may be used together. Further, when a set of anisotropic textures are regarded as continuous texture data, motion picture compression such as MPEG2 (Motion Picture Experts Group 2) or MPEG4 can be performed. The vector quantization or the like can be expected to obtain a considerably high data compression ratio, but there is a problem that it takes much time for coding. On the other hand, MPEG can be expected to attain high-speed compression and extraction when dedicated hardware is used.

The multi-dimensional texture drawing unit is constituted by a texture extraction section 1003, an anisotropic parameter calculating section 1006, a drawing texture generating section 1004, and a drawing section 1005. The texture extraction section 1003 extracts the compressed texture to obtain the set of anisotropic textures. The anisotropic parameter calculating section 1006 calculates an anisotropic parameter from model/shape data to be mapped on, and drawing environment such as a viewing position or lighting conditions at the time of drawing. The drawing texture generating section 1004 generates a texture to be mapped, from the anisotropic textures on the basis of the anisotropic parameter obtained by the anisotropic parameter calculating section 1006. The drawing section 1005 maps the drawing texture generated by the drawing texture generating section 1004 onto the model shape.

Figure 11:
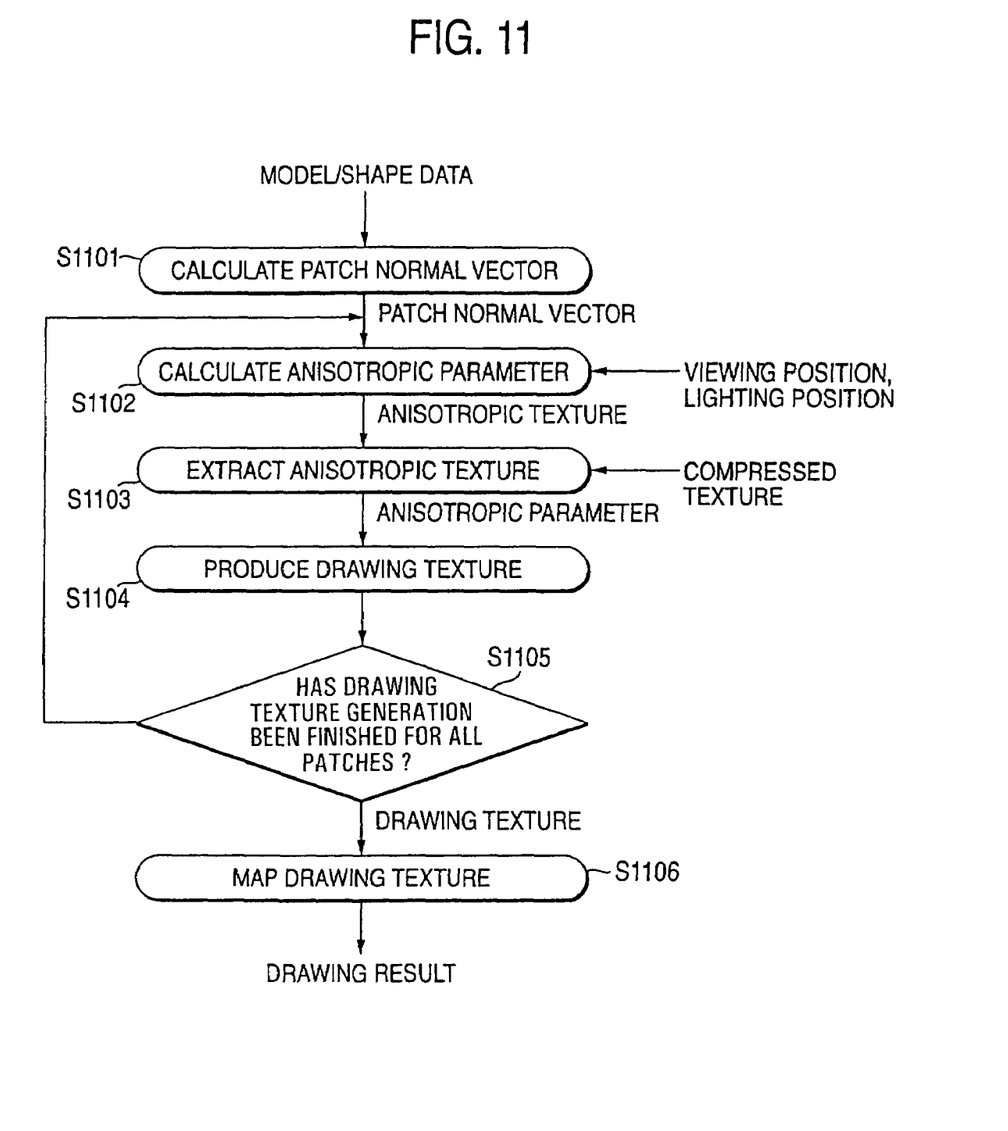
FIG. 11 is a flow chart showing the flow of processing in the multi-dimensional texture mapping system according to the second embodiment.

FIG. 11 is a flow chart showing the flow of processing in the multi-dimensional texture drawing unit according to the second embodiment.

First, a 3-dimensional normal vector and an anisotropic parameter in each patch constituting the model are obtained from model/shape data by the anisotropic parameter calculating section 1006 (S1101 and S1102). The processing here is similar to the processing in the patch normal vector calculation (S302) and the anisotropic parameter calculation (S303) in the first embodiment.

Next, in the texture extraction section 1003, an anisotropic texture image including a texture area for the patch to be drawn is obtained by extracting the compressed texture (S1103).

Then, a texture image required for drawing the patch area is generated from the anisotropic texture extracted in the anisotropic texture extraction (S1103) on the basis of the anisotropic parameter obtained in the anisotropic parameter calculation (S1102), in the drawing texture generating section 1004 (S1104).

It is judged whether the drawing texture generation has been finished for all the patches or not (S1105). When it has not yet been finished, the routine of processing returns to the patch normal vector calculation (S1101) for generating a drawing texture for the next patch.

When the drawing texture generation has been finished for all the patches, the drawing texture generated in the drawing texture generation (S1105) is pasted onto the model by the drawing section 1005 so that drawing is performed (S1106).

The second embodiment is advantageous to the first embodiment in the following point. That is, when anisotropic texture images obtained by conversion are compressed in advance by the multi-dimensional texture compressing unit, a compressed texture can be stored in advance or can be transmitted as a stream from a remote server on a network.

In addition, according to the multi-dimensional texture drawing unit, only an anisotropic texture required for drawing can be selectively extracted for use by the compressed texture extraction section 1003. When a multi-dimensional texture is converted into anisotropic textures and stored in advance, a required multi-dimensional texture image can be identified and clipped in unit of texture coordinates. Thus, there can be obtained a merit that a texture image having no necessity of performing drawing in advance due to shading processing or the like does not have to be extracted. When conversion into anisotropic textures is not carried out, whether a texture should be extracted or not can be judged only by whether a model to be drawn is included in the texture or not. Thus, useless texture extraction is required, and the required amount of memory in extraction becomes extravagant. However, according to the second embodiment, such a problem can be solved.

In addition, since the amount of memory required for extracting a required texture and its periphery may be prepared in the texture extraction section 1003, the second embodiment is also suitable for installation in apparatus such as a portable phone or a portable information terminal (PDA) having a severe restriction in the amount of memory mounted.

Incidentally, the invention is not limited to the embodiments, but various modification can be made in carrying out the invention.

As has been described above, according to the invention, it is possible to provide multi-dimensional texture drawing apparatus and a method thereof, in which a large amount of texture images can be switched by effective use of a memory or calculation resources so that high-quality texture mapping can be performed.

What is claimed is:

1. A multi-dimensional texture drawing apparatus comprising:
   a texture converting unit configured to rearrange a plurality of texture images forming a multi-dimensional texture image in units of particular unit areas to convert the plurality of texture images into a plurality of anisotropic textures, wherein:

each of the plurality of texture images is designated by parameters of a view position and parameters of a lighting position, each of the plurality of anisotropic textures expresses an anisotropic variation of the multi-dimensional texture image in a corresponding unit area, each of the anisotropic textures includes a plurality of block images, and each of the plurality of block images is designated by the parameters of the view position and the parameters of the lighting position of the corresponding unit area;

a parameter calculating unit configured to calculate view position parameters when the view position is viewed from a drawing position on a surface of a model and lighting position parameters when the lighting position is viewed from the drawing position, in accordance with a shape of the model and drawing environment;

an acquiring unit configured to acquire a block image from among the plurality of block images of the plurality of anisotropic textures, the acquired block image being selected based on the parameters of the view position and the parameters of the lighting position corresponding to the calculated view position parameters and the calculated lighting position parameters; and a mapping unit configured to map the acquired block image onto the drawing position on the model.

2. The multi-dimensional texture drawing apparatus according to claim 1, wherein the drawing environment includes a lighting condition.

3. The multi-dimensional texture drawing apparatus according to claim 1, wherein:

the acquiring unit generates a drawing texture from the acquired block image; and the mapping unit maps the drawing texture onto the model.

4. The multi-dimensional texture drawing apparatus according to claim 3, wherein, for each vertex of each patch constituting the shape of the model, the acquiring unit obtains a texture component in an area of the patch on the basis of the calculated view position parameters and the calculated lighting position parameters to perform image composition and generate the drawing texture.

5. The multi-dimensional texture drawing apparatus according to claim 3, wherein the acquiring unit obtains a first texture component corresponding to the calculated view position parameters and the calculated lighting position parameters, and a second texture component neighboring the first component, and performs image composition in consideration of the first and second texture components to generate the drawing texture.

6. The multi-dimensional texture drawing apparatus according to claim 1, wherein:

the view position parameters comprise a first angle between a normal vector of the surface of the model at the drawing position constituting model/shape data as a subject of mapping and a viewing vector defined by a viewing position and the drawing position; and the lighting position parameters comprise a second angle between the normal vector and a lighting vector defined by the lighting position and the drawing position.

7. The multi-dimensional texture drawing apparatus according to claim 1, wherein:

the parameter calculating unit calculates the view position parameters when the view position is viewed from vertexes of each patch on the surface of the model and the lighting position parameters when the lighting position is viewed from the vertexes of each patch on the surface of the model in accordance with the shape of the model and the drawing environment;

the acquiring unit acquires block images corresponding to the respective vertexes of each patch from the anisotropic textures on the basis of the calculated view position parameters and the calculated lighting position parameters, and combines the acquired block images corresponding to the respective vertexes of each patch to generate a block image corresponding to each patch; and the mapping unit maps the generated block image onto each patch of the model.

8. A multi-dimensional texture conversion apparatus comprising:

a texture converting unit configured to rearrange a plurality of texture images forming a multi-dimensional texture image in units of particular unit areas to convert the plurality of texture images into anisotropic textures, wherein:

each of the plurality of texture images is designated by parameters of a view position and parameters of a lighting position, each of the plurality of anisotropic textures expresses an anisotropic variation of the multi-dimensional texture image in a corresponding unit area, each of the plurality of anisotropic textures includes a plurality of block images, and each of the block images is designated by the parameters of the view position and the parameters of the lighting position of the corresponding unit area.

9. The multi-dimensional texture conversion apparatus according to claim 8, further comprising:

a texture compressing unit configured to compress each of the anisotropic textures produced by the texture converting unit.

10. A multi-dimensional texture drawing apparatus comprising:

a parameter calculating unit configured to calculate view position parameters when a view position is viewed from a drawing position on a surface of a model and lighting position parameters when a lighting position is viewed from the drawing position, in accordance with a shape of the model and drawing environment;

a drawing texture generating unit configured to generate a drawing texture from a set of anisotropic textures on the basis of view position parameters and the lighting position parameters calculated by the parameter calculating unit; and a drawing unit configured to draw the drawing texture generated by the drawing texture generating unit, onto the shape of the model, wherein:

the set of anisotropic textures is generated by rearranging a plurality of texture images into the set of anisotropic textures, each of the plurality of texture images forms a multi-dimensional texture image in units of particular unit areas designated by parameters of a view position and parameters of a lighting position, each of the set of anisotropic textures expresses an anisotropic variation of the multi-dimensional texture image in a corresponding texture unit area, each of the set of anisotropic textures comprises a plurality of block images, and each of the plurality of block images is designated by the parameters of the view position and parameters of the lighting position of the corresponding texture unit area.

11. The multi-dimensional texture drawing apparatus according to claim 10, wherein the drawing environment includes a lighting condition.

12. The multi-dimensional texture drawing apparatus according to claim 10, further comprising:
a texture extracting unit configured to extract the set of textures, which is compressed in advance.

13. The multi-dimensional texture drawing apparatus according to claim 12, wherein the texture extracting unit extracts only one of the set of anisotropic textures corresponding to a drawing unit area desired by the drawing texture generating unit.

14. The multi-dimensional texture drawing apparatus according to claim 10, wherein the parameter calculating unit calculates the view position parameters when the view position is viewed from vertexes of each patch on the surface of the model and the lighting position parameters when the lighting position is viewed from the vertexes of each patch on the surface of the model in accordance with the shape of the model and the drawing environment;
the multi-dimensional texture drawing apparatus further comprising an acquiring unit configured to acquire block images corresponding to the respective vertexes of each patch from the anisotropic textures on the basis of the calculated view position parameters and the calculated lighting position parameters, and to combine the acquired block images corresponding to the respective vertexes of each patch to generate a block image corresponding to each patch;
wherein the drawing unit draws the generated block image onto each patch of the model.

15. A multi-dimensional texture drawing system comprising:
a multi-dimensional texture conversion apparatus including a texture converting unit configured to rearrange a plurality of texture images forming a multi-dimensional texture image in units of particular unit areas to convert the plurality of texture images into a set of anisotropic textures, wherein:
each of the plurality of texture images is designated by parameters of a view position and parameters of a lighting position,
each of the set of anisotropic textures expresses an anisotropic variation of the multi-dimensional texture image in a corresponding unit area,
each of the set of anisotropic textures includes a plurality of block images, and
each of the plurality of block images is designated by parameters of a view position and parameters of a lighting position of the corresponding unit area; and
a multi-dimensional texture drawing apparatus including:
a parameter calculating unit configured to calculate view position parameters when a view position is viewed from a drawing position on a surface of a model and lighting position parameters when a lighting position is viewed from the drawing position, in accordance with a shape of the model and drawing environment,
a drawing texture generating unit configured to generate a drawing texture from the set of anisotropic textures, the generated drawing texture being selected based on the parameters of the view position and the parameters of the lighting position corresponding to the view position parameters and the lighting position parameters calculated by the parameter calculating unit, and
a drawing unit configured to draw the drawing texture generated by the drawing texture generating unit onto the shape of the model.

16. The multi-dimensional texture drawing system according to claim 15, wherein:
the multi-dimensional texture conversion apparatus further includes a texture compressing unit configured to compress the set of anisotropic textures produced by the texture converting unit; and
the multi-dimensional texture drawing apparatus further includes a texture extracting unit configured to extract the set of anisotropic textures compressed by the texture compressing unit.

17. The multi-dimensional texture drawing system according to claim 16, wherein:
the multi-dimensional texture conversion apparatus further includes a transmitting unit configured to transmit the set of anisotropic textures compressed by the texture compressing unit to the multi-dimensional texture drawing apparatus through a network.

18. The multi-dimensional texture drawing system according to claim 15, wherein:
the parameter calculating unit calculates the view position parameters when the view position is viewed from vertexes of each patch on the surface of the model and the lighting position parameters when the lighting position is viewed from the vertexes of each patch on the surface of the model in accordance with the shape of the model and the drawing environment;
the drawing texture generating unit acquires block images corresponding to the respective vertexes of each patch from the set of anisotropic textures on the basis of the calculated view position parameters and the calculated lighting position parameters, and combines the acquired block images corresponding to the respective vertexes of each patch to generate a block image corresponding to each patch; and
the drawing unit draws the generated block image corresponding to each patch onto each patch of the model.

19. A multi-dimensional texture drawing method comprising:
rearranging a plurality of texture images forming a multi-dimensional texture in units of particular unit areas to convert the plurality of texture images into a plurality of anisotropic textures, wherein:
each of the plurality of texture images is designated by parameters of a view position and parameters of a lighting position,
each of the plurality of anisotropic textures expresses an anisotropic variation of the multi-dimensional texture image in a corresponding unit area,
each of the plurality of anisotropic textures includes a plurality of block images, and
each of the plurality of block images is designated by the parameters of the view position and the parameters of the lighting position of the corresponding unit area;
calculating the view position parameters when the view position is viewed from a drawing position on a surface of a model and the lighting position parameters when the lighting position is viewed from the drawing position, in accordance with a shape of the model and drawing environment;

acquiring a block image from among the plurality of block images of the plurality of anisotropic textures, the acquired block image being selected based on the parameters of the view position and the parameters of the lighting position corresponding to the calculated view position parameters and the calculated lighting position parameters; and mapping the acquired block image onto the drawing position on the model.

20. The multi-dimensional texture drawing method according to claim 19, wherein:

the calculating comprises calculating the view position parameters when the view position is viewed from vertexes of each patch on the surface of the model and the lighting position parameters when the lighting position is viewed from the vertexes of each patch on the surface of the model in accordance with the shape of the model and the drawing environment;

the acquiring comprises acquiring block images corresponding to the respective vertexes of each patch from the anisotropic textures on the basis of the calculated view position parameters and the calculated lighting position parameters, and combines the acquired block images corresponding to the respective vertexes of each patch to generate a block image corresponding to each patch; and the mapping comprises mapping the generated block image onto each patch of the model.

21. A computer-readable medium encoded with a multi-dimensional texture drawing program which makes a computer execute:

rearranging a plurality of texture images forming a multi-dimensional texture in units of particular unit areas to convert the plurality of texture images into a plurality of anisotropic textures, wherein:

each of the plurality of texture images is designated by parameters of a view position and parameters of a lighting position, each of the plurality of anisotropic textures expresses an anisotropic variation of the multi-dimensional texture image in a corresponding unit area, each of the plurality of anisotropic textures includes a plurality of block images, and each of the plurality of block images is designated by the parameters of the view position and the parameters of the lighting position of the corresponding unit area;

calculating the view position parameters when the view position is viewed from a drawing position on a surface of a model and the lighting position parameters when the lighting position is viewed from the drawing position in accordance with a shape of the model and drawing environment;

acquiring a block image from among the plurality of block images of the plurality of anisotropic textures, the acquired block image being selected based on the parameters of the view position and the parameters of the lighting position corresponding to the calculated view position parameters and the calculated lighting position parameters; and mapping the acquired block image onto the drawing position on the model.

22. The computer-readable medium according to claim 21, wherein:

the calculating comprises calculating the view position parameters when the view position is viewed from vertexes of each patch on the surface of the model and the lighting position parameters when the lighting position is viewed from the vertexes of each patch on the surface of the model in accordance with the shape of the model and the drawing environment;

the acquiring comprises acquiring block images corresponding to the respective vertexes of each patch from the anisotropic textures on the basis of the calculated view position parameters and the calculated lighting position parameters, and combines the acquired block images corresponding to the respective vertexes of each patch to generate a block image corresponding to each patch; and the mapping comprises mapping the generated block image onto each patch of the model.

23. A data conversion method comprising:

rearranging a plurality of texture images forming a multi-dimensional texture image in units of particular unit areas to convert the plurality of texture images into a plurality of anisotropic textures, wherein:

each of the plurality of texture images is designated by parameters of a view position and parameters of a lighting position, each of the plurality of anisotropic textures expresses an anisotropic variation of the multi-dimensional texture image in a corresponding unit area, each of the anisotropic textures includes a plurality of block images, and each of the plurality of block images is designated by parameters of a view position and parameters of lighting position of the corresponding unit area.

* * * * *